United States Patent
Howerter et al.

(10) Patent No.: US 7,451,431 B2
(45) Date of Patent: Nov. 11, 2008

(54) REGISTRY DRIVEN REAL-TIME CONFIGURATION OF RESOURCE MANAGEMENT OBJECTS FOR DEPLOYMENT IN AN INSTANCE OF AN INTEGRATED SOLUTIONS CONSOLE

(75) Inventors: Marcy R. Howerter, Morrisville, NC (US); Robert E. Moore, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/734,556

(22) Filed: Dec. 12, 2003

(65) Prior Publication Data

US 2005/0144618 A1 Jun. 30, 2005

(51) Int. Cl.
*G06F 9/44* (2006.01)
*G06F 7/00* (2006.01)

(52) U.S. Cl. .................. 717/104; 717/105; 717/127; 707/102; 713/100

(58) Field of Classification Search ............... 717/105
See application file for complete search history.

(56) References Cited

U.S. PATENT DOCUMENTS

| | | | |
|---|---|---|---|
| 5,680,619 A * | 10/1997 | Gudmundson et al. ...... 717/108 |
| 5,889,990 A | 3/1999 | Coleman et al. |
| 5,911,066 A | 6/1999 | Williams et al. |
| 5,950,000 A | 9/1999 | O'Leary et al. |
| 5,970,252 A | 10/1999 | Buxton et al. |
| 5,974,253 A * | 10/1999 | Nahaboo et al. ............ 717/105 |
| 6,025,722 A * | 2/2000 | Evans et al. ................. 324/373 |
| 6,052,722 A * | 4/2000 | Taghadoss .................. 709/223 |
| 6,072,492 A * | 6/2000 | Schagen et al. ............. 715/733 |
| 6,163,878 A | 12/2000 | Kohl |
| 6,496,870 B1 | 12/2002 | Faustini |
| 6,760,733 B1 * | 7/2004 | Komine et al. .............. 707/102 |
| 6,918,088 B2 * | 7/2005 | Clark et al. ................. 715/742 |

OTHER PUBLICATIONS

Cardei, I., Jha, R., Cardei, M., and Pavan, A. 2000. Hierarchial architecture for real-time adaptive resource management. In IFIP/ACM international Conference on Distributed Systems Platforms (New York, New York, United States, Apr. 3-7, 2000). Middleware Conference. Springer-Verlag New York, Secaucus, NJ, 415-434.*

(Continued)

*Primary Examiner*—Tuan Q. Dam
*Assistant Examiner*—J. Derek Rutten
(74) *Attorney, Agent, or Firm*—A. Bruce Clay, Esq.; Steven M. Greenberg, Esq.

(57) ABSTRACT

The present invention is a method, system and apparatus for integrating and configuring resource management objects in an integrated solutions console through a linkage with an external registry. The linkage can be a real-time linkage with respect to the development and configuration of the resource management objects in an integrated development environment. The method can include programming a new resource management object to manage a corresponding resource in an enterprise domain. Subsequently, a registry of existing resource management objects can be consulted to determine a proper placement for the new resource management object in a maximal hierarchy of the existing resource management objects. In consequence, the new resource management object can be configured for insertion into the maximal hierarchy based upon the determined proper placement.

18 Claims, 3 Drawing Sheets

OTHER PUBLICATIONS

Author Unknown, *Optimise Your E-Business Infrastructure To Help Lower Your Total Coast of Ownership*, Integrated Performance Management for zSeries Solutions, Copyright IBM Corporation 2003.

Adams, Greg et al., *A New Approach to Flexible, Adaptable Development Tools*, Object Technologies International, Inc. (Dec. 1, 2002) Copyright Reed Business Information 2003 http://www.reed-electronics.com/ecnmag/index.asp?layout=articleID=CA261749 (visited Nov. 21, 2003).

Author Unknown, *Intelligent Management Software for the On Demand World*, IBM Software Group, Tivoli Product Directions.

* cited by examiner

REGISTRY DRIVEN REAL-TIME CONFIGURATION OF RESOURCE MANAGEMENT OBJECTS FOR DEPLOYMENT IN AN INSTANCE OF AN INTEGRATED SOLUTIONS CONSOLE

BACKGROUND OF THE INVENTION

1. Statement of the Technical Field

The present invention relates to the cooperative deployment of resource management objects in an integrated solutions console and more particularly to the integration and arrangement of different resource management objects in a hierarchy for deployment in an integrated solutions console.

2. Description of the Related Art

The rapid evolution of technology and the Internet have created an unforgiving consumer. End-users expect e-business to be fast and focused, providing a quick response to service requests. End users further expect dynamic adaptation to meet new computing demands and the provisioning of uninterrupted, round-the-clock access to products and services. Meeting the demands of this unforgiving consumer can require new levels of integration and performance management.

To remain competitive, the enterprise must deploy the appropriate technology to effectively integrate business processes across the enterprise and with key partners, suppliers and customers. The correct infrastructure can enable e-business agility allowing the business to immediately respond to customer demands, market opportunities and security threats. Yet, building and managing an on-demand operating environment can be difficult even for the most skilled technology team. Years of expanding the system architecture to capitalize on new and more advanced technology has created a complex infrastructure. Despite the complexity, though, the demands remain the same: complete and seamless integration of all disparate and similar technologies.

To facilitate the integration and management of multiple, disparate technologies, integrated resource management systems have been deployed to provide a singular view to the enterprise, despite the disparate nature of the resources disposed therein. Through an integrated solutions console, a view of the enterprise can be provided, not only in reference to the performance of individually monitored resources, but also in respect to the administration of security, the authorization of users, the management of service level agreements and the like. Cutting edge implementations of the integrated solutions console demonstrate unparalleled flexibility by providing a portal view to independently developed resource management components.

Generally, console modules disposed within the integrated solutions console can be charged with the management or monitoring of one or more corresponding resources. Referred to in the art as a "resource management object", each resource management object can be rendered within the integrated solutions console to represent one or more independently developed and self-contained objects directed to a specific target platform or resource. To integrate a particular resource management object within the integrated solutions console, then, requires an awareness on the part of the object developer not only of the structure of the integrated solutions console, but also of the interface to the integrated solutions console through which the resource management object can be added thereto. Importantly, to the extent that a resource management object is to be disposed within a hierarchy of management objects in the integrated solutions console, an awareness must be maintained not only of the architecture and interface of the integrated solutions console, but also of fellow resource management objects disposed within the integrated solutions console.

In the past, the range of target resources managed by any one resource management object remained limited. As such, individual resource management objects often were developed through respective resource management object processes by independent entities without knowledge of one another. Consequently, the manual exercise required to integrate all of the resource management objects in an integrated solutions console remained tolerable.

In particular, in the typical circumstance, the deployment characteristics of each resource management object can be specified within a deployment descriptor based upon the preferences of the developer and the knowledge by the developer of other resource management objects to be deployed in the integrated solutions console. In this regard, each developer of a resource management object must obtain firsthand knowledge of the data disposed within the deployment descriptors of other resource management objects to ensure that all of the resource management objects properly integrate with one another.

Recently, the explosion of the number and complexity of target resources and the source management objects developed to manage these resources has doomed the manual nature of the status quo. As a result, a new level of integration and automation in the development and arrangement of resource management objects for disposal in an integrated solutions console will be required. Moreover, this new level of integration and automation cannot rely upon the ability of different developers to communicate with one another, either directly, or programmatically.

SUMMARY OF THE INVENTION

The present invention addresses the deficiencies of the art in respect to managing the integration of resource management objects in an integrated solutions console and provides a novel and non-obvious method, system and apparatus for integrating and configuring resource management objects in an integrated solutions console through a real-time linkage with an external registry. Specifically, the method can include programming a new resource management object to manage a corresponding resource in an enterprise domain. A registry of existing resource management objects can be consulted to determine a proper placement for the new resource management object in a maximal hierarchy of the existing resource management objects. Subsequently, the new resource management object can be configured for insertion into the maximal hierarchy based upon the determined proper placement.

In a preferred aspect of the invention, the configuring step can include editing a deployment descriptor for the new resource management object to indicate a proper placement of the new resource management object in a navigation hierarchy of an instance of an integrated solutions console. The configuring step also can include the step of modifying the registry to indicate the proper placement. Also, the modifying step further can include the step of modifying the registry to assign a unique identifier to the new resource management object.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for the registry driven real-time development of resource management objects in an integrated development environment for deployment in an instance of an integrated solutions console. In support of the present invention, an instance of an integrated solutions console can provide a view to a subset of a hierarchy of multiple resource management objects configured to manage multiple resources in the enterprise domain as is well known in the art. The resource management objects can be arranged within a navigation hierarchy of the integrated solutions console. In this way, the integrated solutions console can provide a unified view to the management and monitoring of resources in the enterprise.

Importantly, in accordance with the present invention, the entirety of the hierarchy of resource management objects available for deployment within any one instance of the integrated solutions console can be represented within a registry accessible by one or more development processes within an integrated development environment. The integrated development environment itself can be configured to create and deploy resource management objects in an instance of the integrated solutions console. This "maximal hierarchy" within the registry can represent at the time of the development of a new resource management object, a real-time view of the types of organizational nodes, hereinafter "containers", disposed within the hierarchy and the resource management objects disposed within the containers. Consequently, entries within the registry can be used to analyze the maximal hierarchy and to select a suitable existing container in which to dispose the new resource management object to be added to the maximal hierarchy for possible deployment in an instance of the integrated solutions console. To the extent that no suitable, existing container can be identified, a new container can be created in the maximal hierarchy.

Thus, the real-time view into the registry can facilitate the logical integration and arrangement of different resource management objects produced by non-communicative developers without requiring the ad hoc manual configuration of each newly added resource management object. Moreover, by relying upon the maximal hierarchy when adding a new resource management object to the integrated solutions console, it can be ensured that each resource management object can be identified uniquely. Finally, through the use of the registry, individual resource management objects can identify suitable containers in the hierarchy without requiring direct communications with other resource management objects or the development processes used to create the resource management objects.

Figure 1:
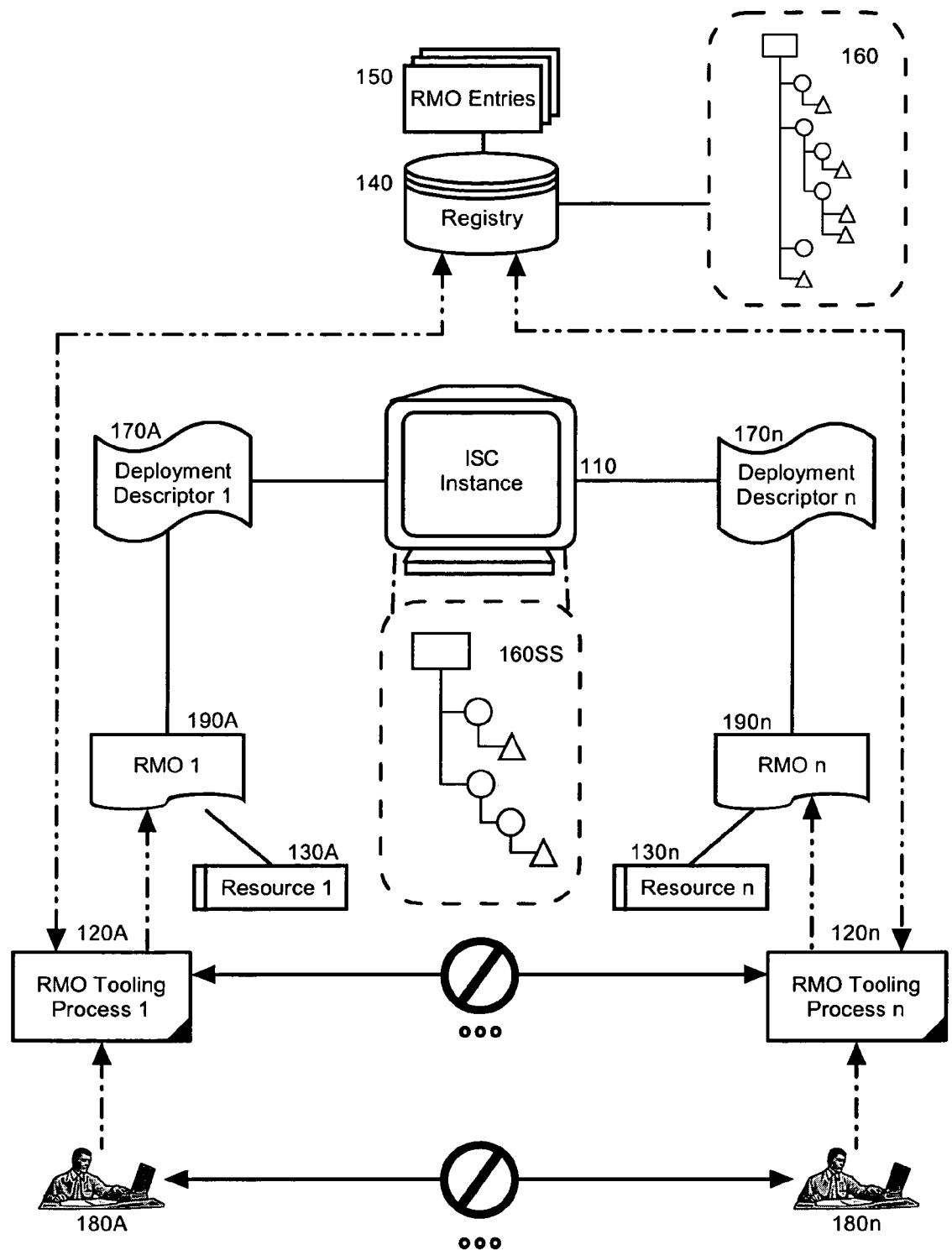
FIG. 1 is a schematic illustration of a system for registry driven real-time development of resource management objects for deployment in an integrated solutions console.

In more particular illustration of the preferred embodiment of the present invention, FIG. 1 is a schematic illustration of a system for registry driven real-time development of resource management objects for deployment in an integrated solutions console. The system can include one or more instances of an integrated solutions console 110 (only one instance shown in detail for the purpose of illustrative simplicity) each instance configured to provide a unified view to different resource management objects 190A, 190n managing different resources 130A, 130n. Preferably, each instance of the integrated solutions console 110 can render a portal based user interface through which the different resource management objects 190A, 190n can be accessed. It will be recognized by the skilled artisan that the resources 130A, 130n can include not only physical resources within the enterprise such as server capacity, memory, disk storage, router and switch operation, and communications bandwidth, but also application and application component availability such as the state of operation of an application server, Web server or database system.

The resource management objects 190A, 190n, by comparison, can range from logic for monitoring the operation of the resources 130A, 130n, to logic for modifying the operation of the resources 130A, 130n, to logic for measuring the performance of the resources 130A, 130n. Notably, multiple ones of the resource management objects 190A, 190n can include the same or similar function, however, each different one of the resource management objects 190A, 190n can differ in implementation so as to support different types of the resources 130A, 130n, or simply where the different ones of the resource management objects 190A, 190n had been produced from different development sources.

Each of the resource management objects 190A, 190n can be produced through a resource management development process 120A, 120n controlled by respective developers 180A, 180n. In this regard, not only can the respective developers 180A, 180n create and compile individual ones of the resource management objects 190A, 190n in a respective development process 120A, 120n, but also the respective developers 180A, 180n can determine a configuration for the resource management objects 190A, 190n. The configuration can be specified within corresponding deployment descriptors 170A, 170n and can include, for example, the placement of the resource management objects 190A, 190n in a hierarchy of research management objects 160, from which a subset 160SS can be selected for operation in the integrated solutions console 110.

In particular, within each instance of the integrated solutions console 110, the resource management objects 190A, 190n can be arranged in a subset 160SS of a maximal hierarchy 160 based upon common functionality, a common targeted one of the resources 130A, 130n or any other suitable criteria for expressing relational commonality. To that end, a plurality of containers can be expressed within the hierarchy and the individual ones of the resource management objects 190A, 190n can be disposed within corresponding ones of the containers. In this regard, the arrangement of the subset 160SS can be specified in a pre-configured manner prior to the instantiation of the instance of the integrated solutions console 110. Significantly, the maximal hierarchy 160 can be persisted to a registry 140 of configuration entries 150 for the resource management objects 190A, 190n. Moreover, while the maximal hierarchy 160 can remain constant for all instances of the integrated solutions console 110, each subset 160SS of the maximal hierarchy 160 can differ within each instance of the integrated solutions console 110.

More specifically, each entry 150 in the registry 140 can express a unique identity for one of the resource management objects 190A, 190n, or a container for holding selected ones of the resource management objects 190A, 190n, or other containers. Each entry 150 further can include a reference to a parent node in the maximal hierarchy 160. In any case, the maximal hierarchy 160 expressed in the registry 140 can provide a real-time view into the arrangement of individual resource management objects 190A, 190n in respect to each other and can provide a mechanism for intelligently integrating a new resource management object into the integrated solutions console 110 without performing an ad-hoc inspection of the descriptors 170A, 170n of other ones of the resource management objects 190A, 190n deployed within the integrated solutions console 110.

Figure 2:
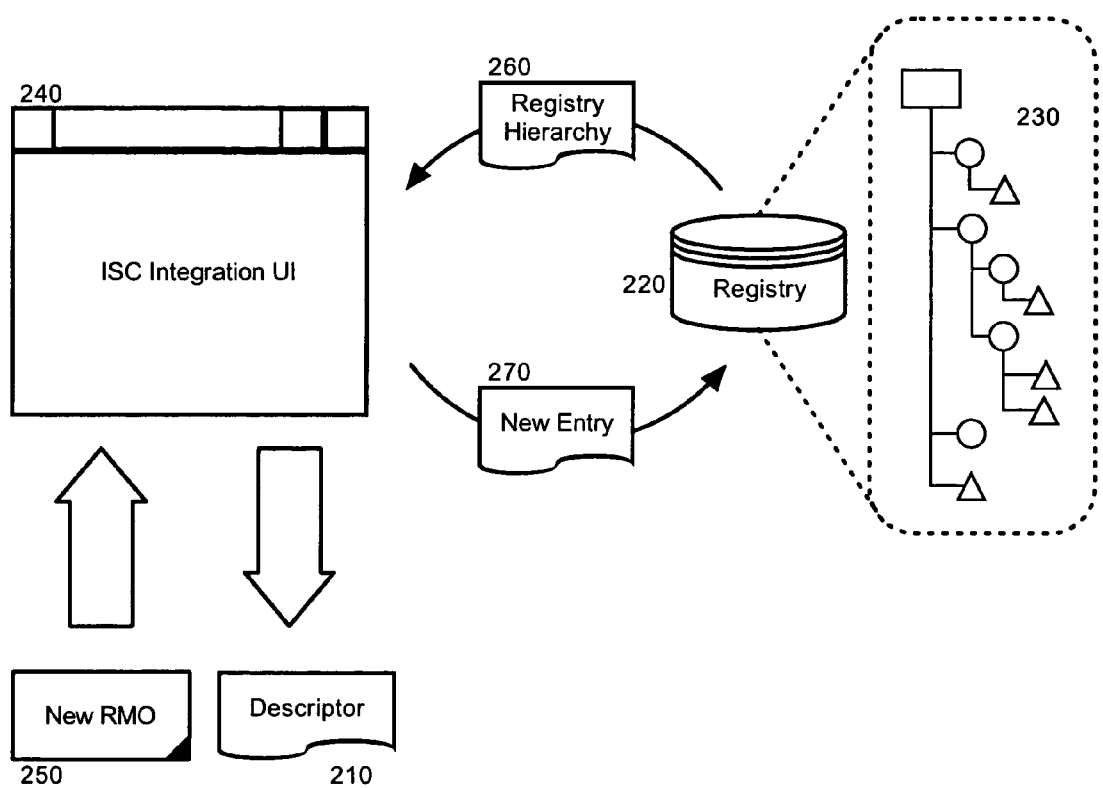
FIG. 2 is a pictorial illustration of a system and method for developing a new resource management object in the system of FIG. 1; and, FIG. 3 is a flow chart illustrating a process for managing a hierarchy of resource management objects and containers in the system of claim 1.

Turning now to FIG. 2, a pictorial illustration is shown of a system and method for adding a new resource management object to the system of FIG. 1. In the method of the invention, a new resource management object 250 can be created for managing a resource disposed within the enterprise. The resource management object 250 can be created within an integrated development environment 240 as is known in the art. Once created, a user interface to the registry 220 can be invoked in association with the integrated development environment 240. When invoked, the user interface can query the registry 220 to retrieve a persisted maximal hierarchy 260 representing the hierarchical arrangement 230 of all resource management objects available for disposal in an instance of the integrated solutions console and their respective containers in the hierarchy.

The maximal hierarchy 260 can be parsed and rendered in the user interface so that it can be determined whether a proper container already exists in the hierarchical arrangement 230 where the new resource management object 250 can be disposed. If it can be determined that a suitable container already exists within the hierarchical arrangement 230, the container can be selected through the user interface and the new resource management object 250 can be added to the hierarchical arrangement 230 in the registry 220. Otherwise, a new container can be created and added to the hierarchical arrangement 230 at a position designated through the user interface. In either case a new entry 270 can be written to the registry 220 to ensure the real-time linkage between the registry 220 and those who might subsequently query the registry 220. Importantly, using the information obtained through an inspection of the maximal hierarchy, a descriptor 210 can be produced to indicate an appropriate placement of the new resource management object 250 in the hierarchical arrangement 230.

Figure 3:
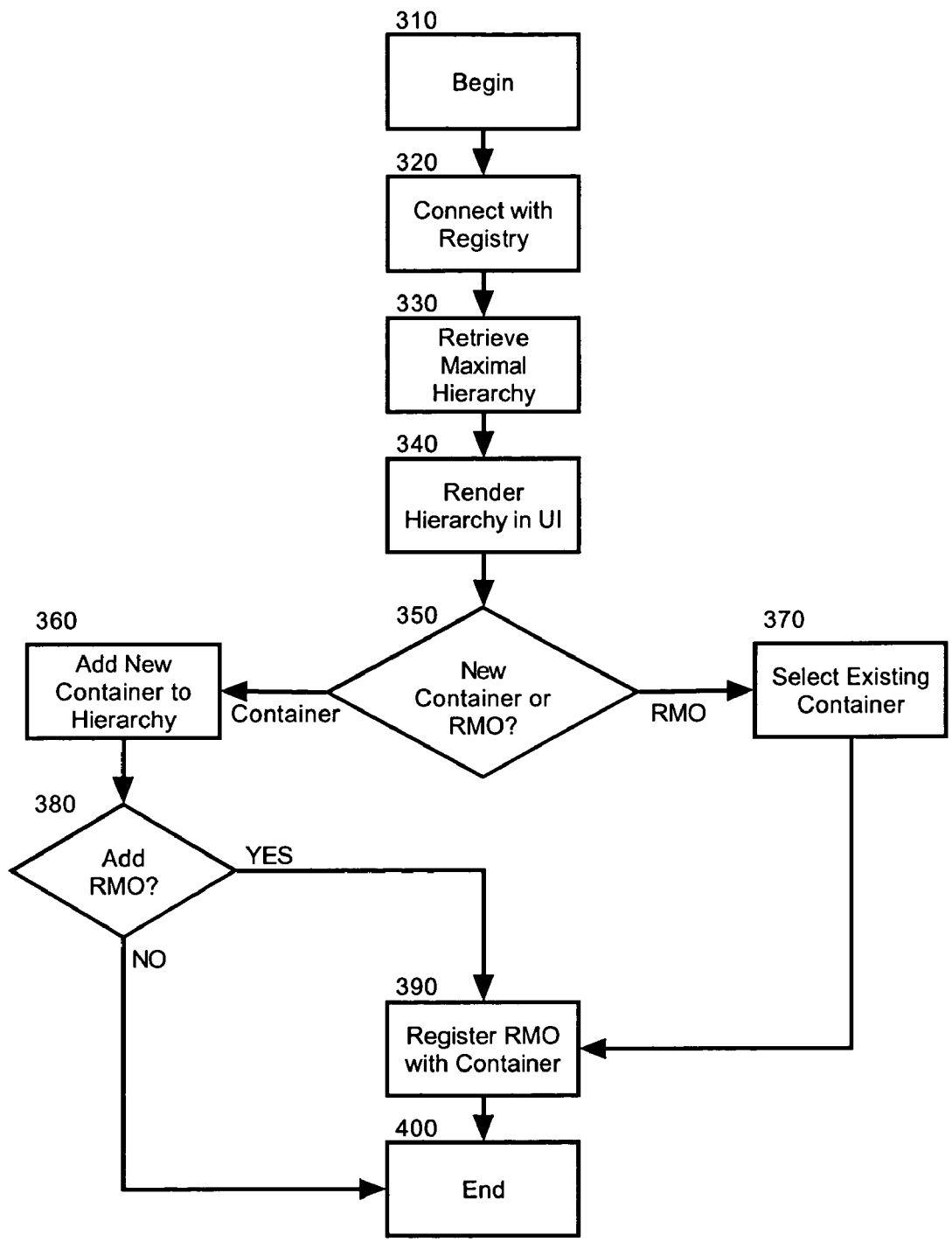

In more specific illustration, FIG. 3 is a flow chart illustrating a process for adding a new resource management object to the system of claim 1. Beginning in block 310 leading into block 320, the user interface can establish a communicative link to the registry. In block 330, the maximal hierarchy can be retrieved and in block 340, the hierarchy can be rendered in the user interface. In this regard, by rendered one skilled in the art will recognize that the organizational and object nodes of the hierarchy can be extracted and placed within suitable user interface elements in which the hierarchy can be expressed, such as in a list, drop down box or a tree structure, though the invention is not limited to any particular method for rendering the hierarchy in the user interface.

In any case, in decision block 350, it can be determined whether a new container is to be added to the maximal hierarchy, or whether a new resource management object is to be inserted into the maximal hierarchy, or both. If a new container is to be added to the hierarchy, in block 360 the container can be added and in decision block 380 it can be determined whether or not to add a new resource management object 380 to the new container. If so, in block 390 the new resource management object 380 can be added to the new container. Otherwise, in block 410 the new container can be registered and in block 400 the process can end. In decision block 350, if it is determined that a new resource management object is to be added to an existing container, in block 370 an existing container can be selected and in block 390, the new resource management object can be registered with the selected container. Finally, the process can end in block 410.

The skilled artisan will understand that by persisting the maximal hierarchy in a universally accessible registry, several distinct advantages can be obtained which were previously lacking among conventional integrated systems for managing enterprise resources. First and foremost, individual developers of new resource management objects can properly tool new resource management objects for integration with other resource management objects in an instance of an integrated solutions console. In this regard, no longer will the individual developers be required to manually collaborate to ensure the proper coexistence between different resource objects in the integrated solutions console.

As an additional advantage of the present invention, container reuse can be encouraged by facilitating the selection of an existing container. Furthermore, individual resource management objects which are disparate in structure, but similar in functionality can be identified and grouped without requiring any one of the resource management objects to communicate with one another. Finally, a uniqueness in identity can be ensured among the resource management objects by policing their position in the hierarchy through the real-time linkage of the registry.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for collaboratively configuring resource objects for deployment in instances of an integrated solutions console, the method comprising the steps of:
   programming a new resource management object to manage a corresponding resource in an enterprise domain;
   consulting a registry of existing resource management objects to determine a proper placement for said new resource management object in a maximal hierarchy of said existing resource management objects; and,
   configuring said new resource management object for insertion into said maximal hierarchy based upon said determined proper placement.

2. The method of claim 1, wherein said configuring step comprises the steps of:
   editing a deployment descriptor for said new resource management object to indicate a proper placement of said new resource management object in a navigation hierarchy of an instance of an integrated solutions console; and,
   modifying said registry to indicate said proper placement.

3. The method of claim 2, wherein said modifying step further comprises the step of modifying said registry to assign a unique identifier to said new resource management object.

4. A system for integrating and arranging resource management objects in an integrated solutions console comprising:
   an instance of an integrated solutions console;
   a registry configured to store a real-time maximal hierarchical representation of a hierarchy of resource management objects registered for accessibility through said instance of said integrated solutions console; and,
   an interface to said registry programmed to render said hierarchical representation and to register a new resource management object for accessibility through said instance of said integrated solutions console from a position in a subset of said hierarchy selected through said interface.

5. The system of claim 4, wherein said interface is disposed within an integrated development environment.

6. The system of claim 4, wherein selected ones of said resource management objects comprise performance monitors.

7. The system of claim 4, wherein said maximal hierarchy comprises a plurality of containers arranged in a tree structure of parent nodes and children nodes in which said resource management objects can be disposed according to interrelationships between said resource management objects.

8. The system of claim 4, wherein each of said resource management objects comprises a unique identifier.

9. The system of claim 4, wherein said instance of said integrated solutions console comprises a portal interface.

10. The system of claim 4, wherein said registry comprises a plurality of entries, each entry specifying a reference to a parent node and one of a container and a resource management object.

11. A method for managing access to resource management objects disposed in a hierarchical subset of resource management objects through an instance of an integrated solutions console, the method comprising the steps of:
   identifying a new resource management object to be added to said hierarchical subset;
   retrieving a real-time representation of a maximal expansion of said hierarchical subset from a registry;
   selecting a position within said maximal expansion of said hierarchical subset through said real-time representation;
   adding said new resource management object to said maximal expansion of said hierarchical subset at said selected position; and,
   modifying said real-time representation in said registry to reflect said new resource management object.

12. The method of claim 11, wherein said selecting step comprises the step of selecting a container within said maximal expansion of said hierarchical subset which relates to a function of said new resource management object.

13. The method of claim 11, wherein said selecting step comprises the step of selecting a container within said maximal expansion of said hierarchical subset which relates to a resource type operated upon by said new resource management object.

14. The method of claim 11, further comprising the steps of:
   assigning a unique identifier to said new resource management object; and,
   storing said unique identifier in said registry in association with said new resource management object.

15. A machine readable storage having stored thereon a computer program for managing access to resource management objects disposed in a hierarchy through an integrated solutions console, the computer program comprising a routine set of instructions which when executed by the machine cause the machine to perform the steps of:
   identifying a new resource management object to be added to said hierarchical subset;
   retrieving a real-time representation of a maximal expansion of said hierarchical subset from a registry;
   selecting a position within said maximal expansion of said hierarchical subset through said real-time representation;
   adding said new resource management object to said maximal expansion of said hierarchical subset at said selected position; and,
   modifying said real-time representation in said registry to reflect said new resource management object.

16. The machine readable storage of claim 15, wherein said selecting step comprises the step of selecting a container within said maximal expansion of said hierarchical subset which relates to a function of said new resource management object.

17. The machine readable storage of claim 15, wherein said selecting step comprises the step of selecting a container within said maximal expansion of said hierarchical subset which relates to a resource type operated upon by said new resource management object.

18. The machine readable storage of claim 15, further comprising the steps of:
   assigning a unique identifier to said new resource management object; and,
   storing said unique identifier in said registry in association with said new resource management object.

* * * * *